United States Patent
Madani et al.

(10) Patent No.: US 12,229,655 B2
(45) Date of Patent: Feb. 18, 2025

(54) METHODS AND SYSTEM FOR DEEP LEARNING MODEL GENERATION OF SAMPLES WITH ENHANCED ATTRIBUTES

(71) Applicant: Salesforce, Inc., San Francisco, CA (US)

(72) Inventors: Ali Madani, Oakland, CA (US); Alvin Guo Wei Chan, Singapore (SG)

(73) Assignee: Salesforce, Inc., San Francisco, CA (US)

(*) Notice: Subject to any disclaimer, the term of this patent is extended or adjusted under 35 U.S.C. 154(b) by 846 days.

(21) Appl. No.: 17/353,691

(22) Filed: Jun. 21, 2021

(65) Prior Publication Data

US 2022/0383070 A1 Dec. 1, 2022

Related U.S. Application Data (60) Provisional application No. 63/194,503, filed on May 28, 2021.

(51) Int. Cl.
*G06N 3/045* (2023.01)
*G06N 3/088* (2023.01)

(52) U.S. Cl.
CPC ............ *G06N 3/045* (2023.01); *G06N 3/088* (2013.01)

(58) Field of Classification Search
CPC ............................... G06N 3/045; G06N 3/088
See application file for complete search history.

(56) References Cited

PUBLICATIONS

Shen, T., Lei, T., Barzilay, R., & Jaakkola, T. (2017). Style transfer from non-parallel text by cross-alignment. Advances in neural information processing systems, 30. (Year: 2017).*
Tolstikhin, I., Bousquet, O., Gelly, S., & Schoelkopf, B. (2017). Wasserstein auto-encoders. arXiv preprint arXiv:1711.01558. (Year: 2017).*
Zhu, J. Y., Park, T., Isola, P., & Efros, A. A. (2017). Unpaired image-to-image translation using cycle-consistent adversarial networks. In Proceedings of the IEEE international conference on computer vision (pp. 2223-2232). (Year: 2017).*
Abid, A., & Zou, J. (2019). Contrastive variational autoencoder enhances salient features. arXiv preprint arXiv:1902.04601. (Year: 2019).*
Anand et al., "Generative modeling for protein structures." Proceedings of the 32nd International Conference on Neural Information Processing Systems. Montreal, Canada. 2018. pp. 1-12.
De Cao et al., "Molgan: An implicit generative model for small molecular graphs." arXiv preprint, https://arXiv:1805.11973v1. May 30, 2018. pp. 1-11.

(Continued)

*Primary Examiner* — Schyler S Sanks
(74) *Attorney, Agent, or Firm* — Haynes and Boone, LLP (57) ABSTRACT

Embodiments described herein provide methods and systems for generating data samples with enhanced attribute values. Some embodiments of the disclosure disclose a deep neural network framework with an encoder, a decoder, and a latent space therebetween, that is configured to extrapolate beyond the attributes of samples in a training distribution to generate data samples with enhanced attribute values by learning the latent space using a combination of contrastive objective, smoothing objective, cycle consistency objective, and a reconstruction loss.

20 Claims, 7 Drawing Sheets

(56) References Cited

PUBLICATIONS

Madani et al., "Progen: Language modeling for protein generation." arXiv preprint, https://arXiv:2004.03497v1. Mar. 8, 2020. pp. 1-17.

Madani et al., "Deep neural language modeling enables functional protein generation across families." bioRxiv preprint. https://doi.org/10.1101/2021.07.18.452833. Jul. 18, 2021. pp. 1-38.

Bepler et al., "Learning the protein language: Evolution, structure, and function." Cell Systems 12. Jun. 16, 2021. pp. 654-669.

Wu et al., "Protein sequence design with deep generative models." Current Opinion in Chemical Biology. 2021. pp. 65:18-27.

Hie et al., "Adaptive machine learning for protein engineering." arXiv preprint. https://arXiv:2106.05466v2. Jul. 6, 2021. pp. 1-9.

Arora et al., "Generalization and equilibrium in generative adversarial nets (GANs)." International Conference on Machine Learning. arxiv preprint. https://arXiv:1703.00573v5. Aug. 1, 2017. pp. 1-27.

Radford et al., "Language models are unsupervised multitask learners." OpenAI. San Francisco, California. 2019. pp. 1-24.

Xu et al., "How neural networks extrapolate: From feedforward to graph neural networks." arXiv preprint. https://arXiv:2009.11848v5. Mar. 2, 2021. pp. 1-52.

Socher et al., "Recursive deep models for semantic compositionality over a sentiment treebank." In Proceedings of the 2013 Conference on Empirical Methods in Natural Language Processing. Seattle, Washington, USA. Oct. 18-21, 2013. pp. 1631-1642.

Chan et al., "Engineering human ACE2 to optimize binding to the spike protein of SARS coronavirus 2." Science 369. 2020. pp. 1261-1265.

Bengio et al., "A neural probabilistic language model." Journal of Machine Learning Research 3. 2003. pp. 1137-1155.

Kumar et al., "Model inversion networks for model-based optimization." arXiv preprint. https://arXiv:1912.13464v1. Dec. 31, 2019. pp. 1-18.

Kingma et al., "Auto-encoding variational bayes." arXiv preprint. https://arXiv:1312.6114v10. May 1, 2014. pp. 1-14.

Devlin et al., "BERT: Pre-training of deep bidirectional transformers for language understanding." arXiv preprint. https://arXiv:1810.04805v2. May 24, 2019. pp. 1-16.

Tolstikhin et al., "Wasserstein auto-encoders." arXiv preprint. hhttps://arXiv:1711.01558v4. Dec. 5, 2019. pp. 1-20.

* cited by examiner

| Original Text (Attribute: "Neutral") | Generated Text (Attribute: "Strongly-positive") |
|---|---|
| A melancholy, emotional film. | A melodramatic film, this is a powerful story. |
| An ambitious and moving *but bleak film*. | An ambitious and light-hearted film, it is a strong and moving story. |
| Some stunning visuals — and some *staggeringly boring cinema*. | An engaging collection of fantastic visuals — and yet at the same time stunningly striking. |
| You'll laugh for not quite an hour and a half, *but come out feeling strongly unsatisfied*. | You will laugh very well and laugh so much you will end up feeling great afterwards. |
| A dark, *dull* thriller with a *parting shot that misfires*. | A dark and compelling thriller that ends with a bitter, compelling punch. |

METHODS AND SYSTEM FOR DEEP LEARNING MODEL GENERATION OF SAMPLES WITH ENHANCED ATTRIBUTES

CROSS-REFERENCE(S)

The present disclosure is a nonprovisional of and claims priority under 35 U.S.C. 119 to U.S. provisional application No. 63/194,503, filed May 28, 2021.

TECHNICAL FIELD

The disclosure relates generally to machine learning models and neural networks, and more specifically to generating data samples with enhanced attributes by the deep learning models.

BACKGROUND

Deep generative neural networks can generate realistic data across different data-types, from sequence to images to time-series data. The deep generative neural networks have applications in domains such as natural language processing, computer vision, and speech.

The neural networks, however, have difficulty in generating samples beyond the training distribution, i.e., deep neural networks have difficulty in generating new data samples with better or enhanced attributes compared to the samples in the training distribution.

Some conventional approaches aim to generalize classification and regression to low data settings. However, imbalanced classification methods upsample or downsample classes or reweight the training cost function. Other methods improve the generalization of regression models in extrapolation and interpolation of the continuous data domain by smoothing both the label and features of the training data.

Another conventional approach is a data-driven design. The data-driven design aims to learn a distribution over a high-dimensional input space that is optimized for a fitness function corresponding to a desirable property. Design methods often iterate sampling from a generator, and then update the generator to assign a higher probability to inputs that a discriminator predicts to have a higher fitness. Autofocused oracles also adapt discriminators throughout the optimization process, from using re-weighting of the training examples in the cost function to make them more reliable in the regions where the generator is more likely to generate. Adaptive sampling uses a fixed discriminator/oracle model and iteratively learns the distribution of inputs conditioned on a desirable property using importance sampling.

Another conventional approach is controllable text generation. Controllable text generation aims to generate text that corresponds to a user-specified attribute. The CTRL generates controlled fluent texts by using control codes which are meta-data prepended to the text during generation. A generative discriminator resulting from contrasting predictions from opposing control codes may be used to guide generation.

BRIEF DESCRIPTION OF THE DRAWINGS

In the figures, elements having the same designations have the same or similar functions.

DETAILED DESCRIPTION

Artificial intelligence, implemented with neural networks and deep learning models, has demonstrated great promise as a technique for automatically analyzing real-world information with human-like accuracy. In general, such neural network and deep learning models are trained to receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques across different applications.

Deep generative neural networks can generate realistic data across data-types, from sequences to images to time-series data, with applications in domains such as natural language processing, computer vision, and speech. That is, based on samples with attributes in a training distribution, deep neural networks can generate additional samples that share the attributes of the training samples. For example, based on training data samples of protein sequences having the attribute of some binding affinity or a nanomaterial structure having the attribute of a ground state energy, deep neural networks can be used to generate other data samples of protein sequences and nanomaterial structures having comparable attribute values.

Attribute extrapolation in sample generation is challenging for deep neural networks operating beyond the training distribution. An enhances sample generation (ESG) module uses an ESG framework to enhance attributes through a latent space. The ESG module may be trained on different datasets, such as movie reviews datasets and a new protein stability dataset. Once trained on the respective datasets, the ESG module may generate strongly-positive text reviews and highly stable protein sequences without being exposed to similar data during training.

In various fields, scientific or otherwise there is a great interest in synthetically generating samples with enhanced attributes, at least because traditional methods tend to be expensive, cumbersome, and resource-intensive.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks, such as supervised or unsupervised neural networks, convolutional neural networks, or memory-augmented neural networks, among others.

Figure 1:
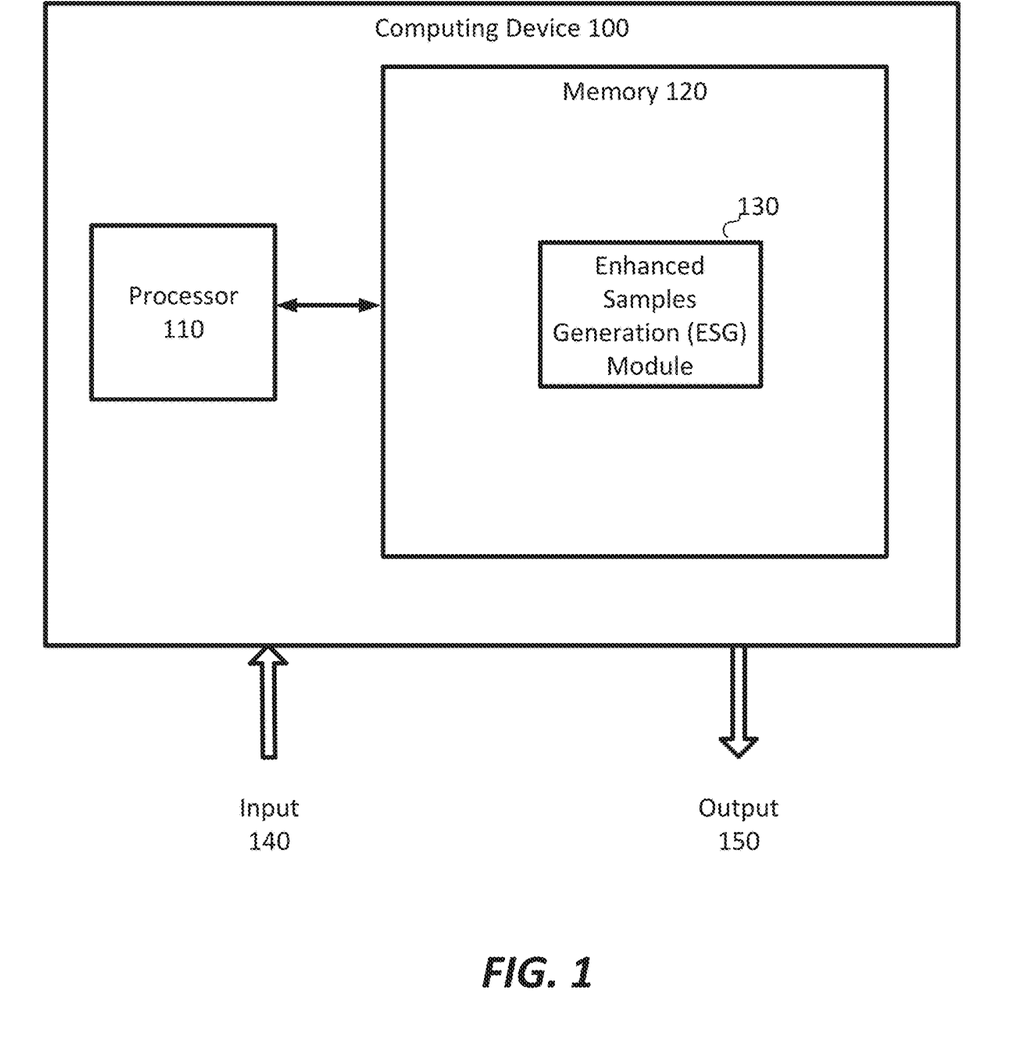
FIG. 1 is a simplified diagram of a computing device according to some embodiments of the disclosure.

FIG. 1 is a simplified diagram of a computing device 100 according to some embodiments. As shown in FIG. 1, computing device 100 includes a processor 110 coupled to memory 120. Operation of computing device 100 is controlled by processor 110. Although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes an enhanced sample generation (ESG) module 130 that may be used to implement and/or emulate the neural network systems and models and/or implement any of the methods described further herein, such as but not limited to the method described with reference to FIG. 3. ESG module 130 may be used, in some examples, for generating data samples with enhanced attribute values. For example, the data samples may be samples of a training distribution related to protein sequences that have given attribute values of binding affinities. In such cases, based on these data samples, the ESG module 130 may be configured to generate data samples of protein sequences with the enhanced attribute values of higher affinity values. As another example, the data samples may be samples of a training distribution related to nanomaterial structures that have given attribute values of ground state energies. In such cases, based on these data samples, the ESG module 130 may be configured to generate data samples of nanomaterial structures with the enhanced attribute values of energetically favorable states (e.g., ground states with lower energy). As another sample, in the movie review space the enhanced attribute value may be a review having a 'Strong Positive' sentiment whereas the unenhanced attribute value was a 'Negative,' 'Neutral' or 'Positive' sentiment in some examples.

As shown, computing device 100 receives input 140, which is provided to ESG module 130. Based on the input, ESG module 130 may generate output 150. In some embodiments, the input 140 may include training data samples of distributions having given attribute values. As noted above, examples include data samples of protein sequences with given attribute values of binding affinities or data samples of nanomaterial structures with given attribute values of ground state energies. The output 150 of ESG module 130 may be a new sequence where the ground truth attribute value may be better than the ground truth attribute in the input sequence. In some embodiments, the output 150 can include data samples with enhanced attribute values. For instance, with respect to the above examples, the output 150 can be data samples of protein sequences with enhanced attribute values of higher affinity values or data samples of nanomaterial structures with the enhanced attribute values of lower ground state energies. For instance, ESG module 130 may receive a sequence of samples as input 140 and generate, as output 150, sequences with target attribute values that are better than the training data used to train ESG module 130. Assuming there is a ground-truth oracle (O) that maps each sample ($x \in \mathbb{R}^d$) to the target attribute value ($y \in \mathbb{R}$), e.g., $y=O(x)$, then, given a dataset of oracle labeled samples (D), ESG module 130 may generate new sequences where its ground-truth attribute value is better than that of the given dataset. This relationship may be shown as follows:

$$y_{new} > y_\tau, \forall (X, y) \in D: y < y_\tau) \tag{1}$$

To generate samples that satisfy this criterion with high probability, ESG module 130 includes a sampling-ranking framework that consists of a sampler S and ranker R. The sampler S proposes a pool of candidate sequences and a ranker R infers and ranks the relative scores of these candidates. The candidate sequences with low scores, e.g. scores below a predefined threshold, may be filtered out excluded from the new sequences. In the ESG module 130, the sampler S may be the generator and the ranker R may be the discriminator of the ESG module 130.

As discussed above, computing device 104 may include memory 120. Memory 120 may include non-transitory, tangible, machine readable media that include executable code that when run by one or more processors (e.g., processor 110) may cause the one or more processors to perform the methods described in further detail herein. In some examples, ESG module 130 may be implemented using hardware, software, and/or a combination of hardware and software.

Figure 2:
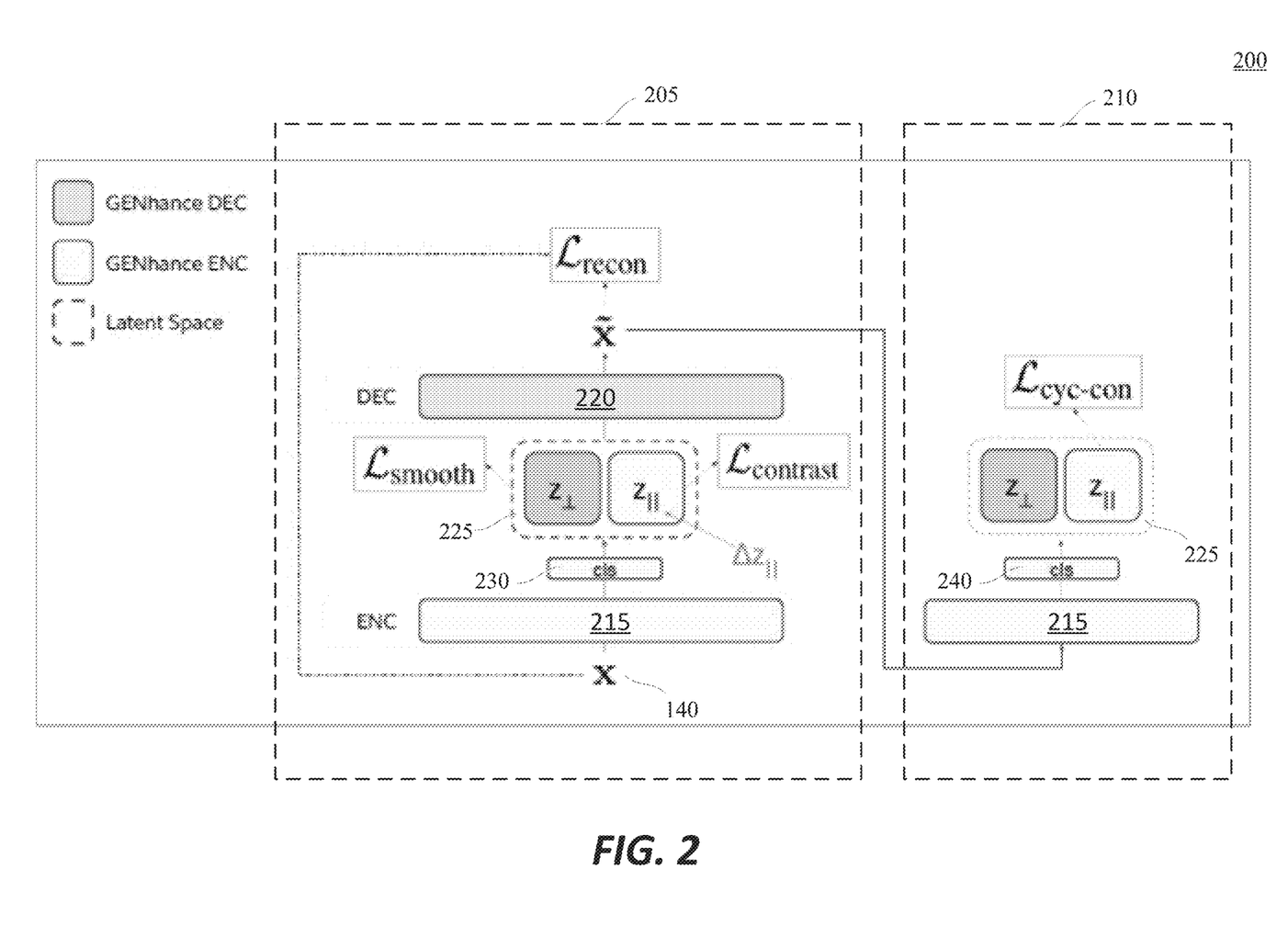
FIG. 2 is an example enhanced sample generative framework for generating data samples with enhanced attribute values, according to some embodiments of the disclosure.

FIG. 2 is a block diagram of an ESG module, according to an embodiment. ESG module 130 may be a framework that includes a neural network or a combination of neural networks. ESG module 130 may comprise a generator, such as GENhance 205 and a discriminator 210. GENhance 205, unlike conventional models, includes an encoder ENC 215, a decoder DEC 220, and a latent space 225 between encoder ENC 215 and decoder DEC 220. The latent space 225 may be configured to extrapolate beyond the attributes of samples in a training distribution by learning the latent space using one or a combination of losses and/or objectives. Example losses and/or objectives may be a contrastive objective, a smoothing objective, a cycle consistency objective, and a reconstruction loss for autoregressive generation. Discriminator 210 may also include encoder (ENC) 215. Typically, encoder (ENC) 215 may be shared by GENhance 205 and discriminator 210. In another embodiment, GENhance 205 and discriminator 210 may have different encoders (ENC).

Encoder (ENC) 215 may receive, as input 140, an input sequence ($x \in \mathbb{R}^{d_x}$) with a given attribute values y, and may generate a latent vector z ($z \in \mathbb{R}^{d_z}$) of a particular input sequence ($x \in \mathbb{R}^{d_x}$). In other words, the latent vector z (latent vector 230) may be generated as z=ENC(x). In some embodiments, latent vector z may be a hidden state at the location of a <cls>token that is prepended to the input sequence.

The latent vector z may include representation relevant and irrelevant to the attribute of interest. The relevant and irrelevant representation may be stored in $z_\|$ and $z_\perp$ respectively, e.g., $z=[z_\|; z_\perp]$. To train encoder (ENC) 215 to store information about the target attribute in $z_\|$, a contrastive objective may be trained to learn which of the two samples in input sequence has a better value of the attribute, as follows:

$$\mathcal{L}_{contrast} = -\log\left[\frac{1}{1 + \exp(\hat{y}_a - \hat{y}_b)}\right], \quad (2)$$

$$\hat{y}_a = f_\|(z_{a\|}), [z_{a\|}; z_{a\perp}] = ENC(x_a), y_a > y_b$$

where ($x_a$, $y_a$) and ($x_b$, $y_b$) are a pair of training samples, each containing an input sequence x and its label y, $f_\|$ is an operation that maps $z_\|$ to a scalar value. In some embodiments, $z_\|$ may have a dimension 1 and $f_\|$ may be an identity operation.

In some embodiments, GENhance 205 may be trained to generate sequences using an objective where the decoder (DEC) 220 may autoregressively reconstruct the input sequence (input 140) as reconstructed sequence x̃ (reconstructed sequence 235), while being conditioned on the latent vector z. In other words, decoder (DEC) 220 may receive latent vector z and generate reconstructed sequence x̃. ESG module 130 may also determine a reconstruction loss between input sequence x̃ and reconstructed sequence x̃. For an input sequence x̃ of length l, parameterizing the encoder (ENC) 215 with θ and decoder (DEC) 210 with ψ, the reconstruction loss may be determined as follows:

$$\mathcal{L}_{recon} = -\sum_{i=t}^{l} \log p_\psi(x_i \mid z, \{x_1, \ldots, x_{i-1}\}) = -\sum_{i=t}^{l} \log p_{\theta,\psi}(x_i \mid x) \quad (3)$$

To ensure that the perturbed latent vector z would result in plausible generations, a smoothing objective may be applied to the latent space 225. An example smoothing objective may be the deterministic Wasserstein autoencoder-maximum mean discrepancy (WAE-MMD) objective. The smoothing objective may train the latent space 225. The WAE-MMD term may penalize divergence of the latent vectors z from a target prior distribution $P_z$, which may be a unit Gaussian, and represented as follows:

$$\mathcal{L}_{smooth} = MMD(P_z, Z) \quad (4)$$

In some embodiments, the WAE-MMD objective works as follows. For a positive-definite reproducing kernel k: $\mathcal{Z} \times \mathcal{Z} \to \mathbb{R}$, the maximum mean discrepancy ($MMD_k$) may be:

$$MMD_k(P_z, Q_z) = \|\int_{\mathcal{Z}} k(z,\cdot)dP_z(z) - \int_{\mathcal{Z}} k(z,\cdot)dQ_z(z)\|_{\mathcal{H}} \quad (5)$$

where $H_k$ is the RKHS of real-valued functions mapping $\mathcal{Z}$ to $\mathbb{R}$. If k is a characteristic then $MMD_k$ defines a metric and can be used as a divergence measure. Since MMD has an unbiased U-statistic estimator, it can be used together with stochastic gradient descent (SGD) during training in the following form:

$$MMD_k(P_z, Q_z) = \frac{1}{n(n-1)}\sum_{l \neq j} k(z_l, z_j) + \frac{1}{n(n-1)}\sum_{l \neq j} k(\tilde{z}_l, \tilde{z}_j) - \frac{2}{n^2}\sum_{l,j} k(z_l, \tilde{z}_j), \quad (6)$$

$$\{z_1, \ldots z_n\} \sim P_z, \{\tilde{z}_1, \ldots \tilde{z}_n\} \sim Q_z$$

where $\{z_1, \ldots z_n\} \sim P_z$ are samples from the target prior distribution $P_z$ and $\{\tilde{z}_1, \ldots \tilde{z}_n\} \sim Q_z$ are the decoded latent vectors z in GENhance 205. For k, a random-feature Gaussian kernel with σ=14 and random feature dimension of 500 may be used.

The reconstructed sequence x̃ may be received and processed by discriminator 210. Discriminator 210 may include encoder (ENC) 215 (which may be the same or another instance of encoder (ENC) 215) which receives reconstructed sequence x̃ and generates a second latent vector z̃ (latent vector 240) in the second latent space 225. To learn a better latent space 225 and have a stronger discriminator 210, ESG module 130 may apply a cycle-consistency learning objective ($\mathcal{L}_{cyc-con}$) to the second latent vector z̃. The cycle-consistency learning objective ($\mathcal{L}_{cyc-con}$) may train encoder (ENC) 215 of discriminator 210 to correctly predict the relative rank between two reconstructed inputs, as follows:

$$\mathcal{L}_{cyc-con} = -\log\left[\frac{1}{1 + \exp(\hat{y}_a - \hat{y}_b)}\right], \hat{y}_a = f_\|(\tilde{z}_{a\|}), \quad (7)$$

$$[\tilde{z}_{a\|}; \tilde{z}_{a\perp}] = ENC(\tilde{x}_a), \tilde{x}_a = DEC(ENC(x_a)), y_a > y_b$$

Since encoder (ENC) 215 of discriminator 210 may be used to rank generated sequences during inference, performance of encoder (ENC) 215 on these synthetic sequences may be improved by training the encoder (ENC) 215 on generated sequences x̃ during the training phase. Further, by backpropagating the $\mathcal{L}_{cyc-con}$ term through ESG module 130, ESG module 130 may learn latent space 225 which generates sequences that are easy for the discriminator 210 to rank accurately. Combining all the training objectives, optimal parameters for the ESG module 130 may be determined using stochastic gradient descent, as follows:

$$\theta^*, \psi^* = \underset{\theta,\psi}{\operatorname{argmin}}(\lambda_{contrast}\mathcal{L}_{contrast} + \quad (8)$$

$$\lambda_{recon} + \mathcal{L}_{recon} + \lambda_{smooth}\mathcal{L}_{smooth} + \lambda_{cyc-con}\mathcal{L}_{cyc-con})$$

where $\lambda_{contrast}$, $\lambda_{recon}$, $\lambda_{smooth}$, and $\lambda_{cyc-con}$ $\mathcal{L}_{cyc-con}$ may be predefined parameters.

After the ESG module 130 is trained, GENhance 205 may be used to sample candidates from latent space 225. The sample candidates may be ranked with the scalar scores output by the encoder ENC 215 in discriminator 210. First, a training sample may be encoded with encoder ENC 215 to sample a latent vector z. Next, to obtain the latent vector encoding for a new candidate sequence with an improved attribute, a perturbation $\Delta z_{\|}$ may be made to the target attribute-aligned latent component $z_{\|}$. At the final step, decoder DEC 210 may condition, on the perturbed latent vector (z'), to generate an improved candidate sample ($\tilde{x}$'), as follows:

$$\tilde{x}=DEC(z'), z'=[(z_{\|}+\Delta z_{\|}], [z_{\|};z_{\perp}]=E\ N\ C(x) \quad (9)$$

The perturbation $\Delta z_{\|}$ is determined as the direction that increases the $f_{\|}$'s score output, e.g., $\frac{\partial f_{\|}(z_{\|})}{\partial z_{\|}}$.

For a linear layer $f_{\|}$, this term is the weight of the layer, while where $f_{\|}$ is an identity operator, $\Delta z_{\|}$ is a scalar.

After generating a pool of candidate samples using encoder (ENC) 215 and decoder (DEC) 220 in GENhance 205, the pool of candidate samples may be ranked using a predicted score of encoder ENC 215 of discriminator 210, as follows:

$$\hat{y}=f_{\|}(ENC(\tilde{x}')) \quad (10)$$

The top-scoring candidates samples, e.g. samples with a score above a threshold or top N samples, may be the new samples with the enhanced attributes. The remaining candidate sample may be dropped.

Figure 3:
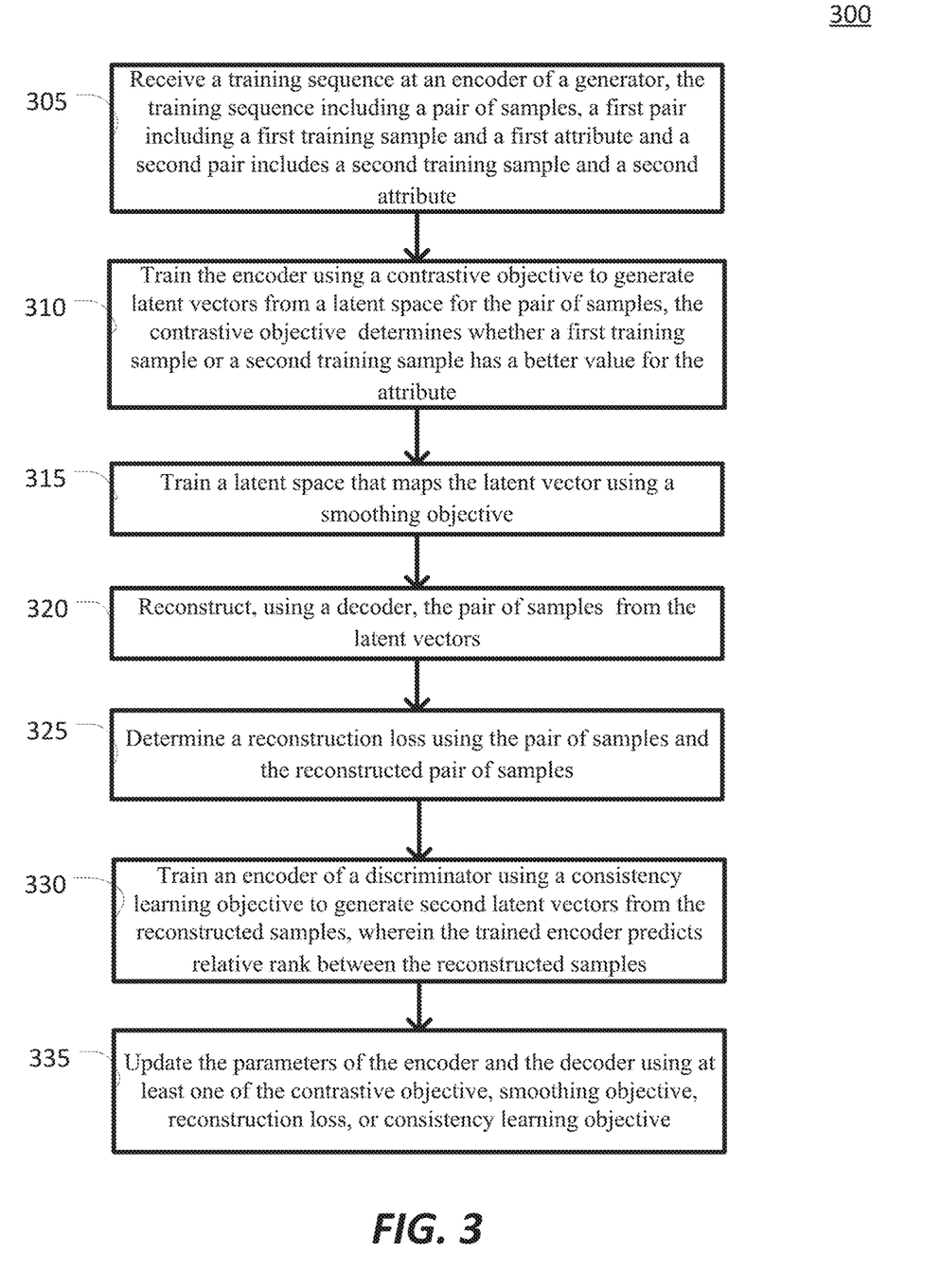
FIG. 3 is a simplified flowchart of a method for training the enhanced sample generative framework, according to some embodiments of the disclosure.

FIG. 3 is a simplified diagram of a method 300 for training the ESG module 130, according to some embodiments. One or more of the processes of method 300 may be implemented, at least in part, in the form of executable code stored on non-transitory, tangible, machine-readable media that when run by one or more processors may cause the one or more processors to perform one or more of the processes. In some embodiments, method 300 corresponds to the operation of ESG module 130 discussed in FIGS. 1 and 2 to perform for training the ESG module 130. The processes 305-335 in method 300 may be repeated for a predefined number of iterations on an entire, half, or a portion of input 140.

At process 305, a training sequence from a training dataset is received. For example, encoder (ENC) 215 of GENhance 205 receives a pair of training samples. Each training sample may include an input sequence x and a corresponding label, which may represent an attribute of interest.

At process 310, an encoder is trained using a contrastive objective. For example, encoder (ENC) 215 of GENhance 205 generates latent vector z, one latent vector for each sample in the pair of samples. The latent vector z is generated in a latent space 225 and may include representations that are relevant and irrelevant to the attribute of interest. The representations may be stored in $z_{\|}$ and $z_{\perp}$. Encoder (ENC) 215 is trained using a contrastive objective. For example, encoder 215 is trained to store information about a target attribute $z_{\|}$ by learning which of the two samples received in process 305 has a better value for the attribute.

At process 315, a latent space is trained. For example, a latent space 225 is trained using a smoothing objective. The smoothing objective may penalize latent vectors z that are diverse from a target prior distribution $P_z$. In some embodiments, a smoothing objective may be achieved using a deterministic Wasserstein autoencoder-maximum mean discrepancy objective.

At process 320, reconstructed sequences $\tilde{x}$ are generated for the pair of samples. For example, decoder (DEC) 220 may generate reconstructed sequences $\tilde{x}$ that are conditioned on latent vectors z. The reconstructed sequences $\tilde{x}$ main include a reconstructed sequence for each input sample in the pair of samples.

At process 325, a reconstruction loss is determined. For example, reconstruction loss may be determined using a difference between input sequence $\tilde{x}$ received in process 305 and the reconstructed sequence $\tilde{x}$ determined in process 320.

At process 330, an encoder is trained using a consistency learning objective. For example, encoder (ENC) 215 of discriminator 210 receives a pair of inputs that include reconstructed sequences $\tilde{x}$ and generates second latent vectors 2. During reconstruction, the encoder (ENC) 215 is trained to correctly predict the relative rank between two reconstructed sequences $\tilde{x}$ using a consistency learning objective.

At process 335, the parameters of encoder (ENC) 215 and decoder DEC 220 are updated with values determined by the contrastive objective, smoothing objective, reconstructive loss, and cycle-consistency learning objective.

Figure 4:
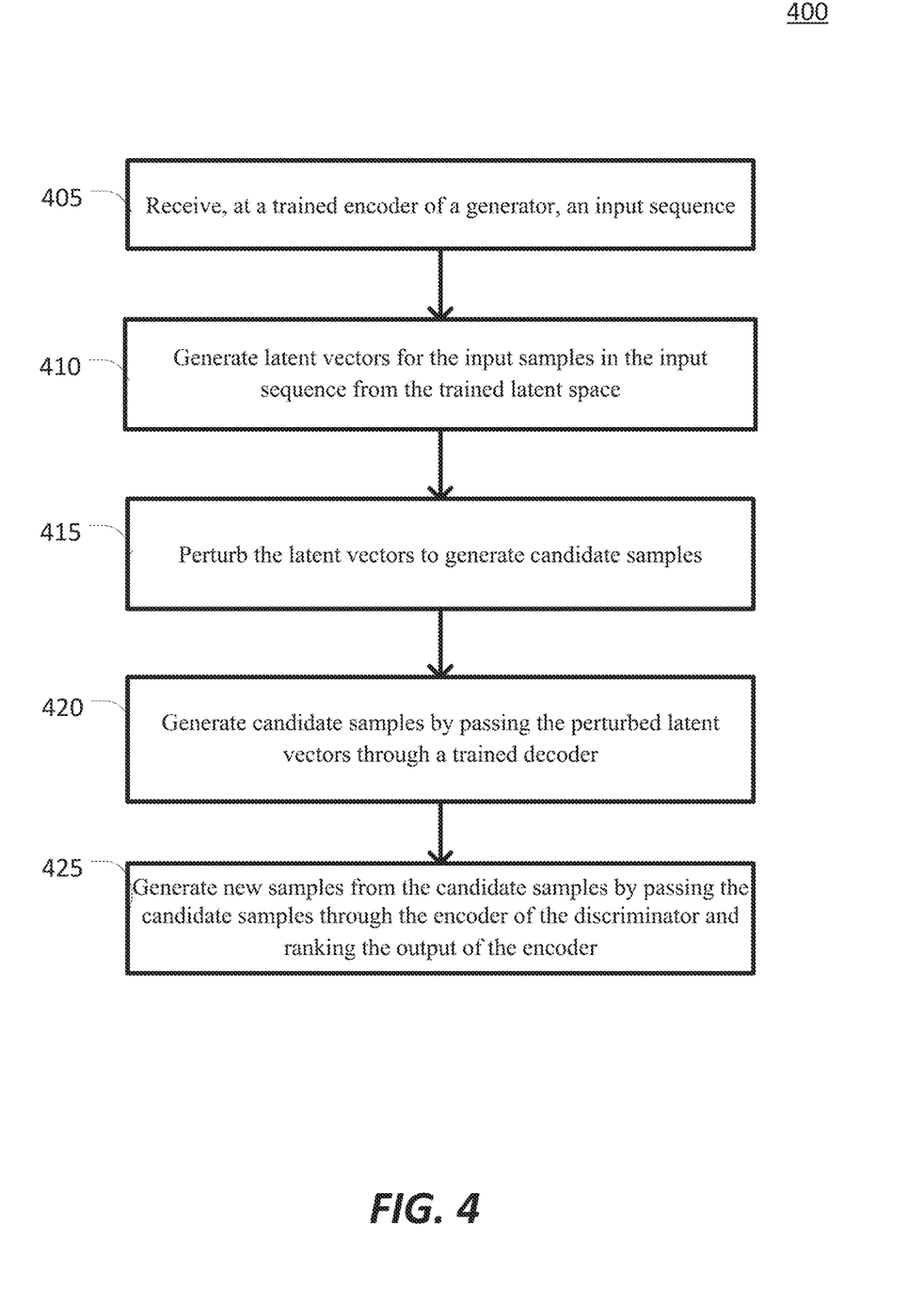
FIG. 4 is a simplified flowchart of a method for generating new samples with enhanced attribute values with the enhanced sample generative framework, according to some embodiments of the disclosure.

FIG. 4 is a simplified diagram of a method 400 for generating data samples with enhanced attributes using ESG module 130, according to some embodiments. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of ESG module 130 discussed in FIGS. 1 and 2 to perform the task of generating, from data samples having given attribute values, data samples that have enhanced attribute values.

At process 405, an input sequence is received. For example, encoder (ENC) 215 trained using method 300 receives an input sequence $\tilde{x}$ that includes input samples.

At process 410, latent vectors z are generated. For example, encoder (ENC) 215 generates latent vectors z in the latent space 225 for the input samples in the input sequence x.

At process 415, the latent vectors are perturbed. For example, latent vectors z are perturbed by $\Delta z_{\|}$. For example, if a function maps the relevant attribute in a latent vector to a scalar value, the perturbation $\Delta z_{\|}$ may be in a direction that increases the scalar value.

At process 420, a candidate samples are determined. For example, decoder (DEC) 220 receives the perturbed latent vectors z' and generates candidate samples $\tilde{x}$'.

At process 425, new samples with enhanced attribute are determined. For example, candidate samples $\tilde{x}$' may be ranked and filtered by passing the candidate samples $\tilde{x}$' through the Encoder (ENC) 215 of discriminator 210. The candidate samples $\tilde{x}$ ' having a score above a predefined threshold or having a score in the top N scores may be kept as the new samples.

In some embodiments, ESG module 130 may be used to generate samples for terms in a natural language, such as terms that indicate a sentiment of a review. An example training dataset, such as the Stanford Sentiment Treebank-5 (SST-5), contains movie reviews from Rotten Tomatoes, which are labeled with one of the five ordinally increasing sentiment labels: 'Strong-Negative', 'Negative', 'Neutral', 'Positive', and 'Strong-Positive'. These sentiment labels may be assigned by a human user based on the human's perception of the review. Each sentiment label may correspond to a predefined value. To train ESG module 130 on the SST-5 dataset, in one example, a 200-Pos training set is generated. To generate the 200-Pos training set, all 'Strong-Positive' examples are removed from the training dataset, but 200 randomly sampled 'Weak-Positive' examples are kept to simulate the presence of a small amount of higher attribute samples from the SST-5. In another example, to train ESG module 130, a No-Pos training set is generated. The No-Pos training set is generated by removing both 'Weak-Positive' and 'Strong-Positive' samples from the SST-5 dataset. The 200-Pos and No-Pos training sets have 5134 and 4934 samples respectively.

During training, the training samples are fed into encoder (ENC) 215 as sequence input x and used as the labels for the decoder (DEC) 210's output for the reconstruction objective.

Once ESG module 130 is trained on the 200-Pos and No-Pos training sets, ESG module 130 may generate 25,000 candidate sequences. The candidate sequences may be ranked into pools of top-100, 1000 and 10000 sequences. The percentage of candidate sequences containing target attributes ('Strong-Positive' & 'Weak-Positive') is computed by using a ground-truth oracle model, such as a pretrained BERT-large model that is finetuned on the full training set SST-5 (including 'Strong-Positive' & 'Weak-Positive' samples) with a classification objective. This oracle model may be trained with a batch size of 32 for 30 epochs and achieves an accuracy of 92.5% for strong-positive vs. neutral/negative classification. The $\Delta z_\|$ perturbations of magnitude equal to 5% of the standard deviation of the training samples' $z_\|$ may be used to generate candidate samples.

In some embodiments, a performance metric $\mathbb{E}$ [% SP] identifies an expected percentage of 'Strong-Positive' generated sequences. The metric has a statistically-relevant measure with an expectation value and uses the 'Strong-Positive' labels alone to maximize Oracle label fidelity, as 'Strong-Positive' labels are almost perfectly distinguishable from the training labels of 'Neutral' and lower. The metric is computed by first randomly sampling a predetermined number of generations from e.g. 25000 candidate samples. Next, filtering the top-100 candidates based on discriminator 210's ranking, and computing the percentage of 'Strong-Positive' candidate samples in top-100 with ground-truth oracle model. Lastly, computing the percentage of the 'Strong-Positive' candidate samples in top-100 may be repeated for e.g. 100 rounds and an average percentage of the "Strong-Positive" candidates may be determined.

As a proxy for text quality, the perplexity value may be computed for each generation using a pretrained GPT-2 large model and average values across the top-K pools are determined.

As indicated by Table 1 and Table 2, below, the ESG module 130 (shown as GENhance) outperforms conventional baselines models, e.g. MCMC model and baseline Gen-Disc model and ablation variants for all percentage of positive metrics. For instance, 49.7% of the more challenging 'Strong-Positive' sequences generated by GENhance are correct, which is almost twice the percentage of samples generated by a conventional baseline Gen-Disc model. Further, the performance of models drops in the % positive metrics for the No-Pos training setup as compared to the 200-Pos setup, except for MCMC-Random model, which is significantly worse in both cases. This reflects the greater challenge in generating desirable candidates when there are no positive samples in the training data.

Table 1 illustrates that ESG module 130 generates a large fraction of attribute-enhanced sequences for SST-5 dataset, when 200 'Weak-Positive' samples are present in the training set. The metrics are computed for top-1000 ranked sequences. Further, the SST-5 test samples have a mean perplexity value of 101.3. CC may be cycle-consistency discussed above.

TABLE 1

| Model | % Positive (↑ better) | % Strong-Positive (↑ better) | Perplexity (↓ better) | $\mathbb{E}$[% SP] (↑ better) |
|---|---|---|---|---|
| Baseline Gen-Disc | 90.6 | 26.7 | 63.9 | 14.2 |
| MCMC-Random | 17.6 | 0.5 | 49696 | 0.17 |
| MCMC-T5 | 54.8 | 10.8 | 224 | 4.58 |
| GENhance w/o Smoothing & CC | 88.2 | 21.5 | 125 | 15.44 |
| GENhance w/o CC | 91.3 | 23.6 | 101 | 16.62 |
| GENhance | 98.7 | 49.7 | 90.5 | 44.33 |

Table 2 illustrates that ESG module 130 generates a large fraction of attribute-enhanced sequences for SST-5 dataset, when no positive samples are present in the training set. The metrics are computed for top-1000 ranked sequences. SST-5 test samples have a mean perplexity value of 101.3. CC may be cycle-consistency discussed above.

TABLE 2

| Model | % Positive (↑ better) | % Strong-Positive (↑ better) | Perplexity (↓ better) | $\mathbb{E}$[% SP] (↑ better) |
|---|---|---|---|---|
| Baseline Gen-Disc | 65.1 | 11.4 | 61.7 | 7.65 |
| MCMC-Random | 22.9 | 0.3 | 20924 | 0.28 |
| MCMC-T5 | 46.4 | 6.2 | 125 | 5.81 |
| GENhance w/o Smoothing & CC | 42.3 | 5.6 | 596 | 5.46 |
| GENhance w/o CC | 69.5 | 9.3 | 126 | 7.8 |
| GENhance | 87.7 | 21.4 | 118 | 19.52 |

Figure 5:
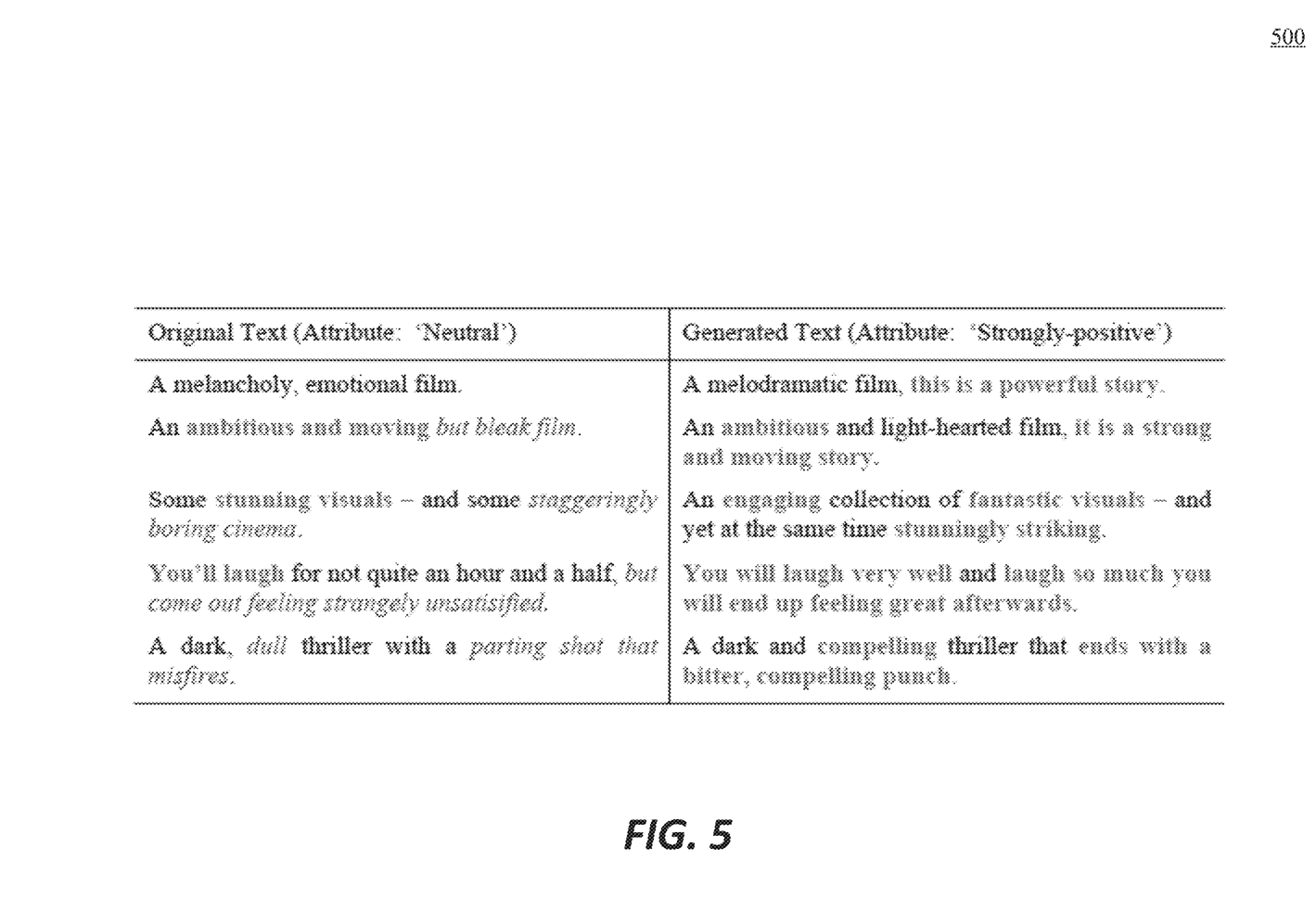
FIG. 5 is a diagram illustrating a movie review with an original language and a language with a sentiment positively enhanced using the enhanced sample generative framework, according to some embodiments of the disclosure.

FIG. 5 is a diagram 500 that illustrates that the ESG module 130 enhances the "neutral" sequences from the SST-5 dataset to be 'Strong-Positive' sequences. Positive words generated in the "strongly-positive" sequences are in bold and negative words are italicized.

Figure 6:
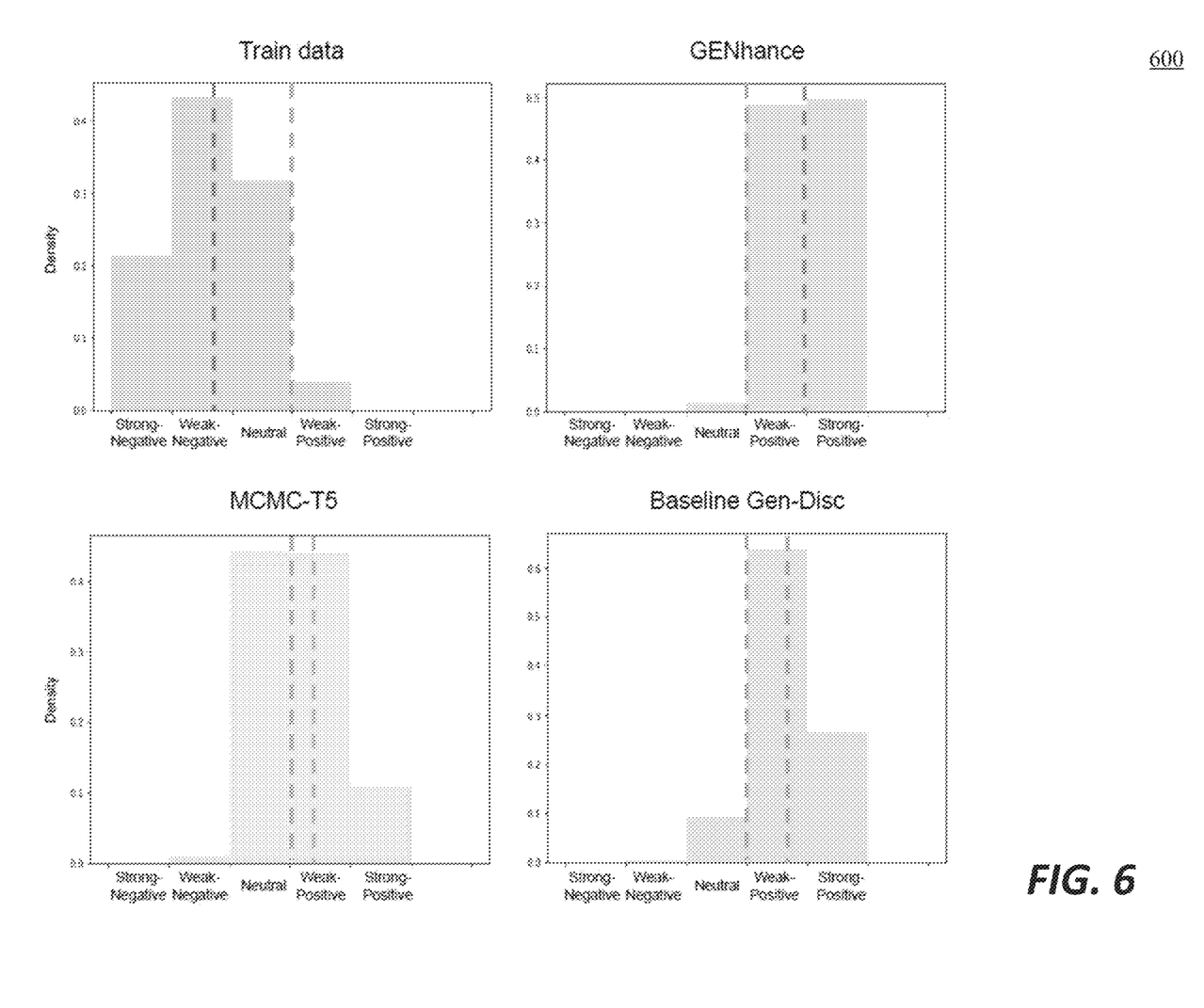
FIG. 6 is a diagram comparing the enhanced dataset generated using the enhanced sample generative framework, datasets generated using conventional frameworks, and a training dataset, according to some embodiments.
Figure 7:
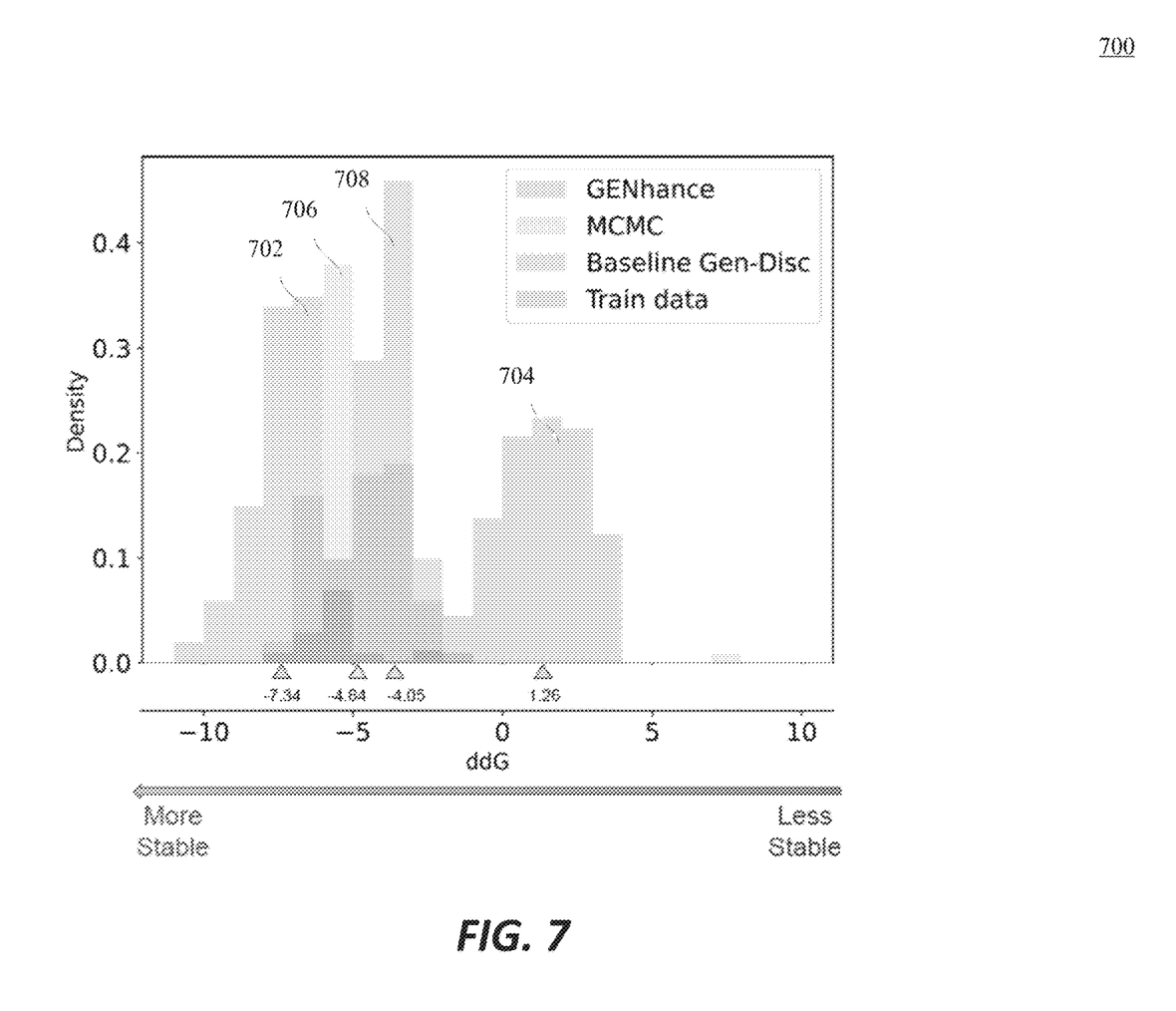
FIG. 7 is a diagram illustrating the stable proteins generated using the enhanced sample generative framework, and comparatively less stable proteins generated using conventional frameworks, and a training dataset of proteins, according to some embodiments.

FIG. 6 is a diagram 600 of tables illustrating attributes for samples generated using ESG module 130 and conventional models that generate samples, as well as the attributes in the training dataset. As illustrated in FIG. 6, ESG module 130 extrapolates a higher proportion of 'Strong-Positive' samples from the training data distribution than the conventional MCMC-T5 and baseline Gen-Disc models.

In some embodiments ESG module 130 may be used to design a protein with an optimized property (e.g. stability), which is an interest to synthetic biology and drug discovery. For example, ESG module 130 may generate a new synthetic dataset of stability for mutations of human angiotensin-converting enzyme 2 (ACE2) protein. Since the SARS-CoV-2 virus binds to ACE2 to gain entry into human organs, the ACE2 has emerged as a promising target for COVID-19 therapeutic protein design. ESG module 130 may be used, for example, to generate an ACE2-like protein sequence that is more stable than samples in a training set. As a proxy for experimentally measured stability of a protein sequence, the free energy calculation via FoldX may be used. The free energy calculation provides an automated, computational oracle for testing 250 extrapolation methods in silico. In particular, a change in free energy from wild-type, ddG or ΔΔG may be measured between the folded and unfolded state of a protein sequence with the known ACE2 structure. A lower ddG value indicates a sequence that is more stable.

To generate a training dataset, the N-terminus subdomain of ACE2 may be mutated. The protein is represented as a sequence of 83 amino acids starting from the N-terminus side, with a vocabulary of 20 amino acids. In some embodiments, 250,000 ACE2 variants may be curated by mutating the wild-type (natural) ACE2 subdomain through substitutions and computing their ddG values. To keep a local landscape of deviation from wild-type, amino acids were substituted by another amino acid with a probability of $P=4/L$ where L is the length of the protein's mutable region. Mutants with more than eight mutations are discarded and a constant region (NTNITEEN) is maintained. The ddG values for each sequence are computed as the average over five FoldX simulations. This dataset may be used to evaluate ESG modules 130's ability to generate protein sequences with lower ddG values than those found in the training distribution. In contrast to the SST-5 dataset discussed above, the ACE2 ddG values lie on a continuous scale, allowing to validate ESG module 130 in the continuous label setting.

The parameters of encoder (ENC) 215 and decoder 220 in ESG module 130 may be initialized to a T5-base model that is pretrained on Uniref 50 with a masked span objective of mean length 3. The ESG module 130 may be finetuned by a pretrained encoder-decoder model.

Once ESG module 130 is trained using the training dataset, ESG module 130 may generate a predefined number of sequences, e.g. 250,000 sequences while eliminating generations without the constant region (NTNITEEN) or with a different sequence length from the wild-type sequence. The discriminator 210 may rank the candidate samples into pools of top-10, 100 and 1000 sequences. The top-K sequences' ddG values are then computed with the FoldX software, taking the average over five simulation runs. The top-5% most stable sequences are used as the initial sequences for MCMC and as the input sequence for GENhance. The $\Delta z_{\|}$ perturbations of magnitude equal to 25% of the standard deviation of the training samples' $z_{\|}$ are used by the ESG module 130. The percent chance of improvement $PCI_{y\tau}$ over the best label (most negative ddG) in training data is measured. To have a statistically-relevant metric, the expected minimum ddG value ($\mathbb{E}$[min]) is developed which is computed by first randomly sampling 10000 of generations from the 25000 generations, then filtering out top-10 candidates based on discriminator's ranking, computing ddG top-10 with FoldX oracle software to find the minimum ddG value among these 10 candidates and repeating the steps above for 100 rounds. The minimum ddG values across these rounds is then averaged.

As illustrated in Table 3, below, ESG module 130 outperforms the conventional models on all metrics in designing more stable sequences. Sequences generated using ESG module 130 have the lowest mean ddG value, with a significant fraction of generations more stable than the most stable sequence in the training set, as indicated by the higher $PCI_{y\tau}$ values. ESG module 130 also has the lowest ($\mathbb{E}$[min]) value, indicating that it may be well-suited to find stable protein candidates in laboratory experiments where only small numbers of candidates can be evaluated due to cost. The metrics are computed for top-100 ranked sequences. CC may be cycle-consistency discussed above.

TABLE 3

| Model | ddG mean (↓ better) | $PCI_{y\tau}$(%) (↑ better) | $\mathbb{E}$[min] (↓ better) |
|---|---|---|---|
| Baseline Disc | −4.05 | 3 | −6.18 |
| MCMC | −4.84 | 9 | −6.89 |
| GENhance w/o Smoothing & CC | −7.16 | 66 | −8.31 |
| GENhance w/o CC | −5.59 | 30 | −7.68 |
| GENhance | −7.34 | 77 | −8.71 |

FIG. 7 is a diagram 700 illustrating the generated ACE2-like sequences generated using the ESG module 130 and conventional models, such as MCMC model and baseline Gen-Disc model. The ACE2-like sequences 702 generated using ESG module 130 show the largest shift in ddG distribution (e.g. stability improvement) from the training set 704 as compared to sequences 706, 708 generated using conventional MCMC and baseline Gen-Disc models respectively. The top-100 ranked generated sequences are shown. In other words, the distribution generated by samples in ESG module 130 shows the largest shift in sequences 702 is toward more stable sequences as compared to the distribution of the training set 704.

Although the embodiments above illustrate how ESG module 130 generates more stable proteins, the ESG module 130 aims to create improved samples with target attributes beyond the training distribution. Scientific applications for ESG module 130 may include the design of proteins, materials, and molecules without expensive, iterative procedures for discovery.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed:

1. A method, comprising:
receiving, at a deep machine learning model, a training dataset having a pair of samples, including a first pair and a second pair, the first pair including a first training sample and a first attribute and the second pair including a second training sample and a second attribute;
training an encoder of the deep machine learning model, using a contrastive objective, to generate a first latent vector in a latent space for the first pair and a second latent vector in the latent space for the second pair;
training the latent space using a smoothing objective;
reconstructing, using a decoder of the deep machine learning model, a reconstructed pair of samples including a reconstructed first pair from the first latent vector and a reconstructed second pair from the second latent vector;
determining a reconstruction loss using the pair of samples and the reconstructed pair of samples;
training the encoder, using a consistency learning objective, to rank the reconstructed first pair and the reconstructed second pair;
updating, at least one parameter in the deep machine learning model, based on at least one of the contrastive objective, smoothing objective, reconstruction loss, or consistency learning objective;
determining that a reconstructed first sample in the reconstructed first pair has a higher rank than a second reconstructed training sample in the reconstructed second pair; and
discarding the second pair based on the determining.

2. The method of claim 1, wherein the updating further comprises updating at least one parameter of the encoder.

3. The method of claim 1, wherein the updating further comprises updating at least one parameter of the decoder.

4. The method of claim 1, wherein the contrastive objective selects the first attribute or the second attribute.

5. The method of claim 1, wherein the first latent vector includes a first representation and a second representation associated with the first attribute.

6. The method of claim 5, wherein the first representation associated with the first attribute is mapped to a scalar value.

7. The method of claim 1, further comprising:
receiving at the encoder an input sample having an attribute;
generating a latent representation for the input sample using the latent space;
perturbing the latent representation, wherein the perturbing changes one of values of the latent representation; and
generating, using the decoder, a candidate sample from the perturbed latent representation.

8. The method of claim 7, further comprising:
ranking, using the encoder, the candidate sample together with other candidate samples determined from other input samples; and
determining that the candidate sample has an enhanced attribute based on the ranking.

9. A system, comprising:
a deep machine learning model comprising an encoder and a decoder, and stored in at least one memory and configured to:
receive a training dataset having a pair of samples, including a first pair and a second pair, the first pair including a first training sample and a first attribute and the second pair including a second training sample and a second attribute;
train the encoder, using a contrastive objective, to generate a first latent vector in a latent space for the first pair and a second latent vector in the latent space for the second pair;
training the latent space, located between the encoder and the decoder, using a smoothing objective;
reconstruct, using the decoder of the deep machine learning model, a reconstructed pair of samples including a reconstructed first pair from the first latent vector and a reconstructed second pair from the second latent vector;
determine a reconstruction loss using the pair of samples and the reconstructed pair of samples;
train the encoder, using a consistency learning objective, to rank the reconstructed first pair and the reconstructed second pair;
update, at least one parameter in the deep machine learning model, based on at least one of the contrastive objective, smoothing objective, reconstruction loss, or consistency learning objective;
determine that a reconstructed first sample in the reconstructed first pair has a higher rank than a second reconstructed training sample in the reconstructed second pair; and
discard the second pair based on the determining.

10. The system of claim 9, wherein to update the at least one parameter, the deep machine learning model is configured to update at least one parameter of the encoder.

11. The system of claim 9, wherein to update the at least one parameter, the deep machine learning model is configured to update at least one parameter of the decoder.

12. The system of claim 9, wherein the contrastive objective selects the first attribute or the second attribute.

13. The system of claim 9, wherein the first latent vector includes a first representation and a second representation associated with the first attribute.

14. The system of claim 13, wherein the first representation associated with the first attribute is mapped to a scalar value.

15. The system of claim 9, wherein the deep machine learning model is further configured to:
receive at the encoder an input sample having an attribute;
generate a latent representation for the input sample using the latent space;
perturb the latent representation, wherein the perturbing changes one of values of the representation that is relevant in the latent representation; and
generate, using the decoder, a candidate sample from the perturbed latent representation.

16. The system of claim 15, wherein the deep machine learning model is further configured to:
rank, using the encoder, the candidate sample together with other candidate samples determined from other input samples; and
determine that the candidate sample has an enhanced attribute based on the ranking.

17. A non-transitory computer readable medium having instructions thereon, that when executed by a processor cause the processor to perform operations that train a deep machine learning network, the operations comprising:
receiving, at a deep machine learning model, a training dataset having a pair of samples, including a first pair and a second pair, the first pair including a first training sample and a first attribute and the second pair including a second training sample and a second attribute;

training an encoder of the deep machine learning model, using a contrastive objective, to generate a first latent vector in a latent space for the first pair and a second latent vector in the latent space for the second pair, the latent space located between the encoder and a decoder;

training the latent space using a smoothing objective;

reconstructing, using the decoder of the deep machine learning model, a reconstructed pair of samples including a reconstructed first pair from the first latent vector and a reconstructed second pair from the second latent vector;

determining a reconstruction loss using the pair of samples and the reconstructed pair of samples;

training a second instance of the encoder, using a consistency learning objective, to rank the reconstructed first pair and the reconstructed second pair; and updating, at least one parameter in the deep machine learning model, based on at least one of the contrastive objective, smoothing objective, reconstruction loss, or consistency learning objective;

determine that a reconstructed first sample in the reconstructed first pair has a higher rank than a second reconstructed training sample in the reconstructed second pair; and discard the second pair based on the determining.

18. The non-transitory computer readable medium of claim 17, wherein the reconstructed first pair from the first latent vector include a reconstructed first training sample.

19. The non-transitory computer readable medium of claim 17, wherein the updating further comprises updating at least one parameter of the encoder or at least one parameter of the decoder.

20. The non-transitory computer readable medium of claim 17, wherein the operations further comprise:

receiving at the encoder an input sample having an attribute;

generating a latent representation for the input sample using the latent space;

perturbing the latent representation, wherein the perturbing changes one of values of the representation that is relevant in the latent representation; and generating, using the decoder, a candidate sample from the perturbed latent representation.

* * * * *